United States Patent Office 2,880,207
Patented Mar. 31, 1959

2,880,207
HALO TRIAZINES

Hansjuergen Schroeder and Christoph J. Grundmann, Columbus, Ohio, assignors to Olin Mathieson Chemical Corporation, a corporation of Virginia No Drawing. Application August 22, 1955
Serial No. 529,928

15 Claims. (Cl. 260—248)

Our invention relates to novel 2,4-bis(alkyl and haloalkyl substituted)-6-halo-1,3,5-triazines of the general formula:

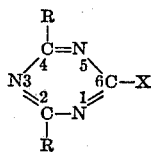

wherein R is an alkyl or haloalkyl radical and X is a halogen. Preferred alkyl radicals are the lower alkyl radicals having from 1 to 4 carbon atoms, i.e., methyl, ethyl, propyl and butyl, although alkyl radicals containing up to 12 carbon atoms are included in the scope of this invention. X and the halogen derivatives of the alkyl radicals include fluorine, bromine, chlorine and iodine. The haloalkyl radicals include, for example, monochloromethyl, dichloromethyl, trichloromethyl and $$CH_3(CH_2)_n CHCl-$$

(where $n=0$ to 12) and the corresponding fluorine, bromine and iodine derivatives. Our novel compounds are useful as fungicides and intermediates.

We have found that 2,4-bis(alkyl or haloalkyl)-6-halo-1,3,5-triazines can be efficiently prepared by reacting phosphorus oxyhalides, preferably phosphorus oxychloride or phosphorus oxybromide, with 2,4-bis(alkyl)-6-hydroxy-1,3,5-triazines or the double salts of 2,4-bis(alkyl or haloalkyl)-6-hydroxy-1,3,5-triazine with amidines. The 2,4-bis(alkyl)-6-hydroxy-1,3,5-triazines are described and claimed in our co-pending application Serial No. 532,120, filed September 1, 1955. The amidine salts are described and claimed in our co-pending application, Serial No. 529,927, filed August 22, 1955. The amidine salts have the formula:

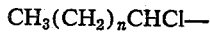

wherein R is an alkyl or haloalkyl radical. The salts in which R is haloalkyl are prepared by the reaction of phosgene with haloalkyl amidines. The salts in which R is alkyl are formed from the haloalkyl compounds by catalytic hydrogenolysis of the haloalkyl groups to alkyl groups. In preparing the compounds of our invention the 6-hydroxytriazine or its amidine salt is refluxed with an excess of the phosphorus oxyhalide at temperatures of about 100° to 200° C. It is advantageous in some cases to include in the reaction mixture sufficient of a tertiary amine, for example, triethylamine, to combine with the HCl formed. After a few hours refluxing, much of the excess phosphorus oxyhalide is suitably removed by distillation and the halotriazine is recovered by crystallization. It is suitably purified by recrystallization.

In use as fungicides, the novel compounds of our invention are suitably formulated as dusts, wettable powders, emulsifiable concentrates or solutions. Siliceous clays in finely divided form are suitable diluents for dusts. An example of such a fungicidal dust is an intimate mixture of about 5 percent of one of our compounds uniformly dispersed on 95 percent of attapulgite. A 50 percent wettable powder can be prepared containing 50 percent by weight of one of our compounds, 40 percent by weight of "Attaclay," 5 percent by weight of "MXP" (a proprietary mixture being about ½ diatomaceous earth and ½ oxyethylated tall oil) and 5 percent by weight of glue (Armour Sticker). An example of an emulsifiable concentrate is a solution of 10 weight percent of one of our compounds, 85 weight percent of xylene and 5 weight percent of a polyoxyethylated alkylphenol such as 12-polyoxyethylene paranonylphenol or para-dodecylphenol.

The compounds of our invention are also useful in preparing 2,4-bis(alkyl or haloalkyl)-6-amino-1,3,5-triazines of the formula:

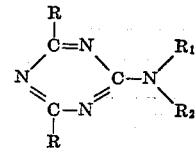

wherein R is an alkyl or haloalkyl radical and $R_1$ and $R_2$ are hydrogen, aryl or alkyl groups or alkylene groups linked together, by reaction with ammonia, primary or secondary amines of the formula:

wherein $R_1$ and $R_2$ are hydrogen, aryl or alkyl groups or alkylene groups linked together, e.g., ethylenimine, as described and claimed in our pending application Serial No. 529,929, filed August 22, 1955.

The compounds of our invention, their preparation and usefulness will be illustrated by the following examples:

Example 1

(A) The crude 2,4-bis(trichloromethyl)-6-hydroxy-1,3,5-triazine-trichloroacetamidine salt (30 grams) and POCl₃ (75 grams) were refluxed at a bath temperature of 125° C. for three hours, after which excess POCl₃ was removed by distillation in vacuum and the remaining viscous residue was triturated with a mixture of ice and water whereupon it formed a solid. The product was dried over P₂O₅ in vacuo and then extracted with Skellysolve. The solution was filtered and evaporated to recrystallize 2,4-bis(trichloromethyl)-6-chloro - 1,3,5 - triazine. The yield was 21 grams or 98 percent of the theory of the product which melted at 56° C.

| | C | N | Cl |
|---|---|---|---|
| Calculated for C₅N₃Cl₇ | 17.04 | 12.00 | 70.86 |
| Found | 17.10 | 12.06 | 70.83 |
| | 17.20 | 11.97 | 70.79 |

(B) The fungicidal properties of 2,4-bis(trichloromethyl)-6-chloro-1,3,5-triazine were determined on four different fungi according to the following procedure:

Threads were infested with a 10 day old culture of a particular fungus. These threads were then treated with (undiluted) 2,4-bis(trichloromethyl)-6-chloro,1,3,5 - triazine and transferred to potato dextrose agar plates. After 7 days, the number of new colonies was observed. The results are tabulated below:

| Fungus | New Colonies After 7 days |
|---|---|
| Botrytis cinerea | 0 |
| Colletotrichum phomoides | 0 |
| Fusarium oxysporum lycopersici | 0 |
| Rhizoctonia solani | 0 |

The appearance of no new colonies indicates complete control over these fungi.

(C) A solution of 2 grams of the 2,4-bis(trichloromethyl)-6-chloro-1,3,5-triazine in 20 milliliters of ether was added at 0° C., to 1 gram of dimethylamine dissolved in 25 milliliters of ether. Dimethylamine hydrochloride separated and was filtered off. The filtrate was evaporated in vacuum and the 2,4-bis-(trichloromethyl)-6-dimethylamino-1,3,5-triazine was recrystallized from Skellysolve. The yield was 1.8 grams or 89 percent of the theory of product which melted at 120° C.

| | C | H | N | Cl |
|---|---|---|---|---|
| Calculated for C₇H₆N₄Cl₆ | 23.43 | 1.68 | 15.61 | 59.28 |
| Found | 22.98 | 1.85 | 15.44 | 59.72 |

*Example II*

(A) According to the procedure of Example I(A), 10 grams of 2,4-bis(dichloromethyl)-6-hydroxy-1,3,5-triazine-dichloroacetamidine salt were chlorinated with 30 grams of POCl₃ to produce 2,4-bis-(dichloromethyl)-6-chloro-1,3,5-triazine. The yield was 5.5 grams, or 72 percent of the theory, of product which melted at 114° C.

| | C | H | N | Cl |
|---|---|---|---|---|
| Calculated for C₅H₃N₃Cl₅ | 21.35 | 0.72 | 14.94 | 63.02 |
| Found | 21.40 | 0.78 | 15.02 | 62.75 |
| | 21.41 | 0.77 | 14.99 | 62.74 |

(B) According to the procedure of Example I(B), 1 gram of 2,4-bis(dichlormethyl)-6-chloro-1,3,5-triazine was aminated to form 2,4-bis-(dichloromethyl)-6-dimethylamino-1,3,5-triazine. The yield was 850 milligrams, or 82 percent of the theory, of product which melted at 78° C.

| | C | H | N | Cl |
|---|---|---|---|---|
| Calculated for C₇H₈N₄Cl₄ | 29.00 | 2.78 | 19.32 | 48.91 |
| Found | 29.36 | 2.82 | 19.18 | 48.87 |

*Example III*

(A) According to the procedure of Example I(A), 7 grams of 2,4-bis-(monochloromethyl)-6-hydroxy-1,3,5-triazine-monochloro-acetamidine salt were reacted with POCl₃ to give 2,4-bis-(monochloromethyl)-6-chloro-1,3,5-triazine. This was distilled in vacuum at 120° C. and then recrystallized from Skellysolve. The yield was 2.5 grams, or 53 percent of the theory, of product which melted at 33.5° C.

| | C | H | N | Cl |
|---|---|---|---|---|
| Calculated for C₅H₄N₃Cl₃ | 28.26 | 1.89 | 19.77 | 50.06 |
| Found | 28.35 | 2.23 | 19.74 | 49.63 |
| | 28.16 | 2.42 | 19.81 | 49.75 |

*Example IV*

(A) A mixture of 1 gram of 2,4-dimethyl-6-hydroxy-1,3,5-triazine-acetamidine salt, 1 gram of triethylamine, and 8 grams of POCl₃ were refluxed for one-half hour. The excess of POCl₃ and the dimethylchloro-triazine were then removed by distillation. The 2,4-dimethyl-6-chloro-1,3,5-triazine crystallized in the condenser and, after cooling, in the distilled POCl₃. After filtering off from the POCl₃, it was dissolved in ether, filtered, and the ethereal solution evaporated. The residue was recrystallized from Skellysolve, and the yield was 270 milligrams or 35 percent of the theory of 2,4-dimethyl-6-chloro-1,3,5-triazine which melted at 64° C.

| | C | H | N | Cl |
|---|---|---|---|---|
| Calculated for C₅H₆N₃Cl | 41.82 | 4.21 | 29.27 | 24.70 |
| Found | 41.76 | 4.30 | 29.21 | 24.50 |
| | 41.59 | 4.35 | 29.39 | 24.65 |

(B) A mixture of 0.5 gram of free 2,4-dimethyl-6-hydroxy-1,3,5-triazine, 4 grams of POCl₃, and 0.5 gram of triethylamine was refluxed for 30 minutes. The 2,4-dimethyl-6-chloro-1,3,5-triazine was recovered following the procedure of Example IV(A). The yield was 85 milligrams or 15 percent of the theory of product which melted at 64° C.

We claim:

1. 2,4-bis(chloroalkyl)-6-chloro-1,3,5-triazine in which the alkyl group contains not more than 12 carbon atoms.
2. 2,4-bis(trichloromethyl)-6-chloro-1,3,5-triazine.
3. 2,4-bis(dichloromethyl)-6-chloro-1,3,5-triazine.
4. 2,4-bis(monochloromethyl)-6-chloro-1,3,5-triazine.
5. The process of preparing 2,4-bis(substituted)-6-halo-1,3,5-triazine of the formula

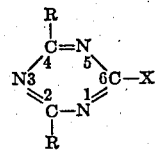

in which R is selected from the group consisting of alkyl and haloalkyl radicals and X is a halogen, which comprises reacting 2,4-bis(substituted)-6-hydroxy-1,3,5-triazine amidine salts of the formula

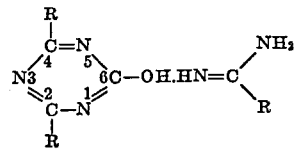

in which R is selected from the group consisting of alkyl and haloalkyl radicals containing not more than 12 carbon atoms, with a phosphorus oxyhalide at a temperature of about 100 to 200° C. and in proportions and for a time effective to produce the 6-halo-triazines.

6. The process of claim 5 in which R is chloroalkyl and the oxyhalide is an oxychloride.
7. The process of preparing 2,4-bis(trichloromethyl)-6-chloro-1,3,5-triazine which comprises reacting 2,4-bis(trichloromethyl) - 6 - hydroxy - 1,3,5 - triazine - trichloroacetamidine salt with phosphorus oxychloride at a temperature of about 100 to 200° C. and in proportions and for a time effective to produce the 6-chlorotriazine.
8. The process of preparing 2,4-bis(dichloromethyl)-6-chloro-1,3,5-triazine which comprises reacting 2,4-bis-(dichloromethyl) - 6 - hydroxy - 1,3,5 - triazine - dichloroacetamidine salt with phosphorus oxychloride at a temperature of about 100 to 200° C. and in proportions and for a time effective to produce the 6-chloro-triazine.
9. The process of preparing 2,4-bis(monochloromethyl)-6-chloro-1,3,5-triazine which comprises reacting 2,4 - bis(monochloromethyl) - 6 - hydroxy-1,3,5-triazine-monochloroacetamidine salt with phosphorus oxychloride at a temperature of about 100 to 200° C. and in proportions and for a time effective to produce the 6-chlorotriazine.

10. The process of claim 5 in which R is an alkyl radical and the oxyhalide is an oxychloride.

11. The process of preparing 2,4-dimethyl-6-chloro-1,3,5-triazine which comprises reacting 2,4-dimethyl-6-hydroxy-1,3,5-triazine-acetamidine salt with phosphorus oxychloride at a temperature of about 100 to 200° C. and in proportions and for a time effective to produce the 6-chloro-triazine.

12. The process of preparing 2,4-bis(substituted)-6-halo-1,3,5-triazine of the formula

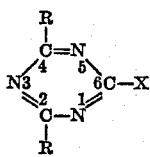

in which R is an alkyl radical and X is a halogen, which comprises reacting 2,4-bis(alkyl)-6-hydroxy-1,3,5-triazine in which the alkyl group contains not more than 12 carbon atoms with a phosphorus oxyhalide at a temperature of about 100 to 200° C. and in proportions and for a time effective to produce the 6-halo-triazines.

13. The process of preparing 2,4-dimethyl-6-chloro-1,3,5-triazine which comprises reacting 2,4-dimethyl-6-hydroxy-1,3,5-triazine with phosphorus oxychloride at a temperature of about 100 to 200° C. and in proportions and for a time effective to produce the 6-chloro-triazine.

14. 2,4-bis(haloalkyl)-6-halo-1,3,5-triazine in which the alkyl group contains not more than 12 carbon atoms.

15. The process of preparing 2,4-bis(substituted)-6-halo-1,3,5-triazine of the formula

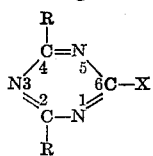

in which R is selected from the group consisting of alkyl and haloalkyl radicals and X is a halogen, which comprises reacting a hydroxy-triazine selected from the group consisting of (1) 2,4-bis(substituted)-6-hydroxy-1,3,5-triazine amidine salts of the formula

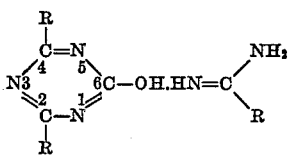

in which R is selected from the group consisting of alkyl and haloalkyl radicals in which radicals the alkyl group contains not more than 12 carbon atoms, and (2) 2,4-bis(alkyl)-6-hydroxy-1,3,5-triazine in which the alkyl group contains not more than 12 carbon atoms, with a phosphorus oxyhalide at a temperature of about 100 to 200° C. and in proportions and for a time effective to produce the 6-halo-triazines.

References Cited in the file of this patent
UNITED STATES PATENTS

| | | |
|---|---|---|
| 2,537,816 | Dudley | Jan. 9, 1951 |
| 2,653,934 | Kaiser | Sept. 29, 1953 |
| 2,691,018 | Joyce | Oct. 5, 1954 |
| 2,810,706 | Frazier | Oct. 22, 1957 |